United States Patent
Verschueren

(10) Patent No.: US 12,070,894 B2
(45) Date of Patent: Aug. 27, 2024

(54) TRIMMING OF CONTOURED POLYMERIC PANELS

(71) Applicant: DUPONT SAFETY & CONSTRUCTION, INC., Wilmington, DE (US)

(72) Inventor: Eddy Verschueren, Mechelen (BE)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 1057 days.

(21) Appl. No.: 16/986,406

(22) Filed: Aug. 6, 2020

(65) Prior Publication Data

US 2022/0040903 A1  Feb. 10, 2022

(51) Int. Cl.

| | | |
|---|---|---|
| *B29C 51/44* | (2006.01) | |
| *B23C 3/12* | (2006.01) | |
| *B29C 51/26* | (2006.01) | |
| *B29K 23/00* | (2006.01) | |
| *B29K 33/00* | (2006.01) | |

(52) U.S. Cl.
CPC ............. *B29C 51/44* (2013.01); *B23C 3/12* (2013.01); *B29C 51/268* (2013.01); *B29K 2023/06* (2013.01); *B29K 2023/12* (2013.01); *B29K 2033/12* (2013.01)

(58) Field of Classification Search
CPC ....... B25J 15/0616; B25J 11/006; B26D 3/02; B29C 51/44; B29C 51/268; B29C 51/261; B29C 2793/0027; B29C 2793/009; B23C 3/12; B29K 2023/12; B29K 2033/12; B29K 2023/06
See application file for complete search history.

(56) References Cited

U.S. PATENT DOCUMENTS

| 4,666,544 A | * | 5/1987 | Whiteside | ............... B29C 51/22 |
|---|---|---|---|---|
| | | | | 156/499 |
| 8,709,332 B2 | * | 4/2014 | Rapaport | ............ B29C 66/4326 |
| | | | | 264/511 |
| 2004/0104506 A1 | | 6/2004 | Schelmbauer et al. | |

FOREIGN PATENT DOCUMENTS

| CN | 111438921 A | 7/2020 |
|---|---|---|
| DE | 202004011250 U1 | 10/2004 |
| EP | 3379966 B1 | 5/2020 |

OTHER PUBLICATIONS

Translation of DE 20 2004 011 250 (Oct. 7, 2004).*
International Search Report and Written Opinion in International Application No. PCT/US2021/042713, issued on Oct. 25, 2021.

* cited by examiner

*Primary Examiner* — Monica A Huson

(57) ABSTRACT

A method for trimming a thermoformed panel comprises the steps of opening a thermoforming mold to reveal the thermoformed panel, attaching a robotic arm holding means to the thermoformed panel, removing the thermoformed panel from the thermoforming mold by the robotic arm holding means, repositioning the robotic arm holding means over a trimming table, the table comprising a cutting router affixed to the table bed, moving the robotic arm holding means relative to the cutting router in directions to trim all edges of the panel to required panel dimensions, moving the robotic arm and trimmed panel to a panel collection station, and depositing the trimmed panel at the collection station, wherein the directional movement of the robotic arm is controlled by input from 3-dimensional drawing software of the final shape of the thermoformed panel, and wherein the thermoformed panel is of a polymeric material.

7 Claims, 1 Drawing Sheet

TRIMMING OF CONTOURED POLYMERIC PANELS

BACKGROUND OF THE INVENTION

1. Field of the Invention

This invention is in the field of contoured polymeric panels.

2. Description of Related Art

New architectural building designs are increasingly featuring contoured external shapes. This in turn brings challenges to efficiently produce architectural cladding or façade panels particularly when the building design specifies a plurality of one-off double-curved panels. A further trend is to replace concrete structures with lighter weight polymeric materials.

Traditional methods utilize the use of wooden or foam molds for panel forming. A disadvantage of these forming tools is that they are unique to one shape and therefore different tools are required when there are many different shaped components. More recently, new tooling concepts have been developed wherein a single tool can produce a variety of panel components thus offering efficiencies in manufacture.

United States patent application publication 2004/0104506A1 to Schelmbauer et al. describes a robotic method and apparatus for removing finished parts from a trim press of a thermoforming system including a pick and place tool mechanism moveable on at least a two-axis gantry mechanism arranged adjacent the trim press, the pick and place tool being moveable into and out of the trim press to acquire and remove finished thermoformed parts from the trim press. Movement of the pick and place tool is synchronized with the trim press cycle. The method may include a conveyance system mounted adjacent the pick and place mechanism for placing and stacking the finished thermoformed parts thereon once such parts are removed from the trim press.

There remains a need to provide further efficiency gains in contoured panel forming operations such as panel trimming.

BRIEF SUMMARY OF THE INVENTION

This invention pertains to a method for trimming a thermoformed panel comprises the steps of:
opening a thermoforming mold to reveal the thermoformed panel,
attaching a robotic arm holding means to the thermoformed panel,
removing the thermoformed panel from the thermoforming mold by the robotic arm holding means,
repositioning the robotic arm holding means over a trimming table, the table comprising a cutting router affixed to the table bed,
moving the robotic arm holding means relative to the cutting router in directions to trim all edges of the panel to required panel dimensions,
moving the robotic arm and trimmed panel to a panel collection station, and
depositing the trimmed panel at the collection station, wherein the directional movement of the robotic arm is controlled by input from 3-dimensional drawing software of the final shape of the thermoformed panel, and wherein the thermoformed panel is of a polymeric material.

DETAILED DESCRIPTION OF THE INVENTION

Panel Composition

Any thermoformable polymeric material may be used for the panel. In some embodiments the polymeric material is polyethylene (PE) or polypropylene (PP) or unfilled polymethyl methacrylate (uPMMA), filled polymethyl methacrylate (fPMMA) or unsaturated polyester. An exemplary filled polymethyl methacrylate is Corian® which is available from DuPont Safety and Construction Inc., Wilmington, DE Panel Thermoforming Preferably, the thermoformed panel of this invention is a contoured panel, i.e., it is not flat. Exemplary contoured panels are single or double curvature panels. By single curvature is meant that the panel curves in only one direction, either upwards or downwards. By double curvature is meant that the panel curves in two directions both downwards and upwards.

Figure 1:
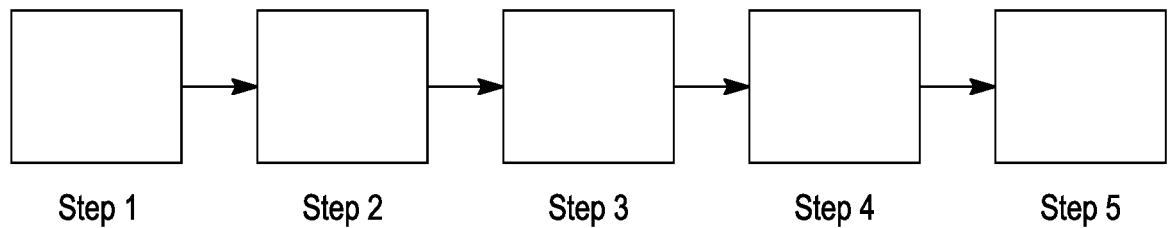
FIG. 1 is a block diagram of a process for making a contoured polymeric panel.

FIG. 1 provides an overview of a process for making a contoured polymeric panel such as a double curvature panel.

The panel feedstock is a flat sheet of a necessary length, width and thickness such that finished panel shape and dimensions can be achieved. The shape of the panel feedstock will vary depending on the shape of the finished panel. Exemplary feedstock panel shapes are triangular, square, rectangular, pentagonal, hexagonal etc.

In step 1, the panel feedstock is placed in heating oven to preheat the panel and make the panel pliable. The temperature of the oven and dwell time of the panel in the oven will vary depending on the panel composition and thickness. Typical preheating temperatures are from 100 to 170° C. and dwell times from 5 to 15 minutes.

In step 2, the lower surface of the panel is placed on the lower half of a thermoforming vacuum molding tool and the upper half of the tool then positioned over the upper surface of the panel to close the tool. Any suitable vacuum molding tool may be used, for example an adaptive surface mold such a technique being well known in the plastic molding art. The panel remains in the tool for enough time to allow the panel to fully conform to the desired shape, this time being determined by the panel composition, panel thickness and type of tool. Typical processing conditions for this step are pressures of from 0.5-1.5 bar, preferably about 0.8 bar and press times of from 5-30 minutes. After the desired dwell time in the mold, the mold is cooled such that the temperature of the panel is well below its glass transition temperature.

In step 3, after molding has been completed, the upper half of the tool is removed to reveal the contoured thermoformed panel. The panel is then removed from the mold. This removal process is achieved by attaching a robotic arm holding means to the thermoformed panel and then removing the panel from the mold by the robotic arm holding means. In one embodiment, the robotic arm holding means comprises suction cups located at the extremity of the robotic arm.

Figure 2:
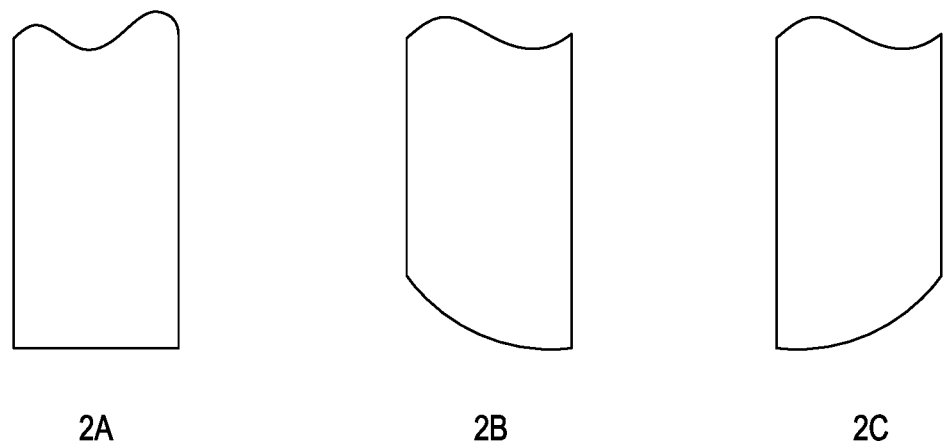
FIG. 2 shows exemplary trimmed edge shapes.

In step 4, the robotic arm holding means repositions the panel over a trimming table, the table comprising a cutting router affixed to the table bed. The robotic arm holding means moves the panel relative to the cutting router in directions to trim all edges of the panel to required panel dimensions. The directional movement of the robotic arm is controlled by input from 3-dimensional drawing software of the final shape of the thermoformed panel, Panel edges may be straight or curved (chamfered) as shown by examples in FIG. 2. In FIG. 2, 2a is a square edge trim and 2b and 2c curved edge trims.

In step 5, the robotic arm moves the trimmed panel to a panel collection station and deposits the trimmed panel at the collection station In an optional further embodiment, the robotic arm holding means may position the panel at a drilling station and move the panel such that holes are drilled at desired positions either partially or fully through the panel. This step may be completed before or after the edge trimming operation of step 4.

EXAMPLES

Panel composition, dimensions and processing conditions are shown in Table 1. A number of different conditions was tried for some of the panels. Trimmed panel edge quality was a visual assessment. If the trimmed edge was smooth the quality was deemed to be good.

TABLE 1

| Panel Composition | Feedstock Panel Dimensions (mm) | Panel Curvature (Single or Double) | Step 1 Preheating Time (mins) and Temperature (° C.) | Step 2 Thermoforming Time (mins) and Pressure (bar) | Trimmed Panel Edge Quality |
|---|---|---|---|---|---|
| PE | 900 * 550 * 12 | Double | 10 min @ 120° C. | 10-20 min @ 0.9 bar | Good |
| PP | 900 * 550 * 12 | Double | 12 min @ 140° C. | 10-20 min @ 0.9 bar | Good |
| uPMMA | 900 * 550 * 12 | Double | 10-15 @ 140° C. | 15-25 min @ 0.9 bar | Good |
| fPMMA (Corian ®) | 900 * 550 * 12 | Double | 15 min @ 145-165° C. | 15-25 min @ 0.9 bar | Good |

Utility

This method of trimming highly contoured panels finds utility in external cladding panels, internal cladding panels, furniture, sculptures and other applications. The trimmed edges are of sufficient quality that adjacent panels may be adhesively bonded at the edges. The panels may be fixed to the article structure by screws, bolts, pins, adhesives, tapes or other fixing means.

The invention claimed is:

1. A method for trimming a thermoformed panel comprising the steps of
    opening a thermoforming mold to reveal the thermoformed panel,
    attaching a robotic arm to the thermoformed panel,
    removing the thermoformed panel from the thermoforming mold by the robotic arm,
    repositioning the thermoformed panel attached to the robotic arm over a trimming table, the table comprising a cutting router affixed to the table bed,
    moving the robotic arm relative to the cutting router in directions to trim edges of the thermoformed panel to required panel dimensions,
    moving the robotic arm and trimmed thermoformed panel to a panel collection station, and
    depositing the trimmed thermoformed panel at the collection station,
    wherein the directional movement of the robotic arm is controlled by input from 3-dimensional drawing software of the final shape of the trimmed thermoformed panel, and
    wherein the thermoformed panel is of a polymeric material.

2. The method of claim 1 further comprising an optional step of the robotic arm positioning the attached thermoformed panel at a drilling station and moving the thermoformed panel such that holes are drilled at desired positions either partially or fully through the thermoformed panel.

3. A trimmed thermoformed panel made by the method of claim 1, wherein the trimmed thermoformed panel is a double curvature panel.

4. A trimmed thermoformed panel made by the method of claim 1.

5. The method of claim 1 wherein the trimmed thermoformed panel is a double curvature panel.

6. The method of claim 1 wherein the polymeric material of the thermoformed panel comprises polyethylene, polypropylene, unfilled polymethyl methacrylate, filled polymethyl methacrylate, or unsaturated polyester.

7. The method of claim 1 wherein the thermoformed panel is attached to the robotic arm by suction cups.

* * * * *